(12) United States Patent
Young et al.

(10) Patent No.: US 8,898,272 B1
(45) Date of Patent: Nov. 25, 2014

(54) IDENTIFYING INFORMATION IN RESOURCE LOCATORS

(71) Applicants: Samuel J. Young, Seattle, WA (US); Matthew L. Trahan, Seattle, WA (US); Saral Jain, Seattle, WA (US); Peter F. Hill, Seattle, WA (US); Ameet N. Vaswani, Seattle, WA (US); Brett R. Taylor, Seattle, WA (US)

(72) Inventors: Samuel J. Young, Seattle, WA (US); Matthew L. Trahan, Seattle, WA (US); Saral Jain, Seattle, WA (US); Peter F. Hill, Seattle, WA (US); Ameet N. Vaswani, Seattle, WA (US); Brett R. Taylor, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 245 days.

(21) Appl. No.: 13/633,594

(22) Filed: Oct. 2, 2012

(51) Int. Cl.
*G06F 15/16* (2006.01)
*H04L 29/06* (2006.01)
*H04L 29/08* (2006.01)

(52) U.S. Cl.
CPC ............. *H04L 63/0407* (2013.01); *H04L 67/22* (2013.01)
USPC .......................................... 709/223; 709/224

(58) Field of Classification Search
CPC . H04L 63/0407; H04L 67/2895; H04L 67/22; G06Q 30/02; G06Q 30/0255; H04N 21/42684
USPC .................................. 709/200–203, 217–227
See application file for complete search history.

(56) References Cited

U.S. PATENT DOCUMENTS

| | | | | |
|---|---|---|---|---|
| 6,460,060 | B1 * | 10/2002 | Maddalozzo et al. | 715/234 |
| 7,076,453 | B2 * | 7/2006 | Jammes et al. | 705/26.62 |
| 7,089,582 | B1 * | 8/2006 | Dutta | 726/3 |
| 7,299,201 | B2 * | 11/2007 | Jammes et al. | 705/27.1 |
| 7,464,264 | B2 | 12/2008 | Goodman et al. | |
| 7,818,206 | B2 * | 10/2010 | Smith et al. | 705/14.1 |
| 2002/0019828 | A1 | 2/2002 | Mortl | |
| 2003/0083938 | A1 * | 5/2003 | Smith et al. | 705/14 |
| 2003/0167213 | A1 * | 9/2003 | Jammes et al. | 705/27 |
| 2004/0073713 | A1 * | 4/2004 | Pentikainen et al. | 709/249 |
| 2008/0010402 | A1 | 1/2008 | Fujimoto et al. | |
| 2008/0201401 | A1 * | 8/2008 | Pugh et al. | 709/201 |
| 2011/0295988 | A1 | 12/2011 | Le Jouan | |
| 2012/0271702 | A1 * | 10/2012 | MacLachlan et al. | 705/14.26 |

* cited by examiner

*Primary Examiner* — Moustafa M Meky
(74) *Attorney, Agent, or Firm* — Knobbe, Martens, Olson & Bear, LLP (57) ABSTRACT

Processes are disclosed for identifying site-specific or domain-specific URL parameters that are likely associated with personally identifiable information (PII). The processes involve analyzing the browsing session records of multiple users to assess, for a given site or domain, the uniqueness levels of particular URL parameters. These uniqueness levels, alone or in combination with other criteria, are used to determine whether each such parameter is likely associated with PII. The results of this analysis may be used to filter likely PII from session records, such as by modifying and/or deleting the URLs likely to contain PII.

22 Claims, 4 Drawing Sheets

IDENTIFYING INFORMATION IN RESOURCE LOCATORS

BACKGROUND

A variety of methods exist for collecting browse history data reflective of the browsing behaviors of users across a variety of web sites. For example, proxy servers and other intermediary systems commonly log the URL (Uniform Resource Locator) requests of users by monitoring network traffic. As another example, some companies offer browser toolbars or plug-ins that report back to the company's servers the URL requests made by users. Browsing behaviors are also commonly logged by the origin servers of the web sites. The browse history data collected by these and other methods may be used for a variety of purposes, such as to generate personalized content for users or to generate statistical data that is useful to content providers.

Regardless of the particular data collection method or methods used, the collected browse history data frequently includes personally identifiable information (PII) in the form of URL parameters. Ideally, the PII should be removed from the logged URLs—or the PII-containing URLs deleted—to reduce or eliminate privacy issues. The task of identifying URLs and URL parameters that contain PII, however, is complex, as different web sites commonly use very different URL formats.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Processes are disclosed for identifying site-specific or domain-specific URL parameters that are likely associated with personally identifiable information (PII). The processes involve analyzing the browsing session records of multiple users to assess, for a given site or domain, the uniqueness levels of particular URL parameters. These uniqueness levels, alone or in combination with other criteria, are used to determine whether each such parameter is likely associated with PII. The results of this analysis may be used to filter likely PII from session records, such as by modifying and/or deleting the URLs likely to contain PII.

Filtering URLs can be useful for organizations that wish to retain URL data or other user session information, for example, in order to track long term trends, popular pages on various domains, popular products offered on the various domains and/or the like. However, an organization may not want to retain personally identifiable information in order to respect the privacy of users and/or comply with privacy policies and laws. Thus, the organization can use a data filtering system ("DFS") to remove personally identifiable information from the data the domain has collected.

In some embodiments, the data filtering system analyzes user session records from transactions between user client devices and various sites or domains, which may be stored in various logs or records stored by or accessible to the system, to identify tags or other markers in the session records that tend to indicate the presence of personally identifiable information ("PII") such as names, addresses, user identifiers, email addresses or the like. For example, in the case of URLs, the data filtering system can analyze stored URL data to identify URL parameters, typically represented by key-value pairs having a fixed key portion and a variable value portion, that tend to be associated with personally identifiable information. Once the system has identified these URL parameters, the system can filter out instances of these parameters, including the value data, in the stored records in order to sanitize the records of PII.

In order to identify parameters that indicate or include PII, in one embodiment, the data filtering system determines a uniqueness score for each parameter and identifies parameters with high uniqueness scores as likely associated with PII. Highly unique scores indicate that the query parameter values change based on the user. Many times, value variations based on the user are caused by the inclusion of some information unique to the user, such as a session identifier, user identifier, email address, physical address, phone number or the like. Thus, uniqueness can be used by the data filtering system as an indicator of the presence of PII.

Throughout this description, the term "web site" or "domain" is used to refer to a networked computing system or web server system that responds to URL requests from user computing devices by returning content, including web pages. A web site or domain ordinarily includes one or more physical servers (which may but need not be co-located), and may include various other types of computing devices (load balancers, switches, etc.). The functions described herein may be implemented in a data collection system that logs URL sequences reflective of the browsing behaviors of users across arbitrary web sites or domains. In some embodiments, the data collection system is located at one or more of the web sites or at one or more intermediary systems between the web sites and the clients.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Examples of a Data Filtering System

Figure 1:
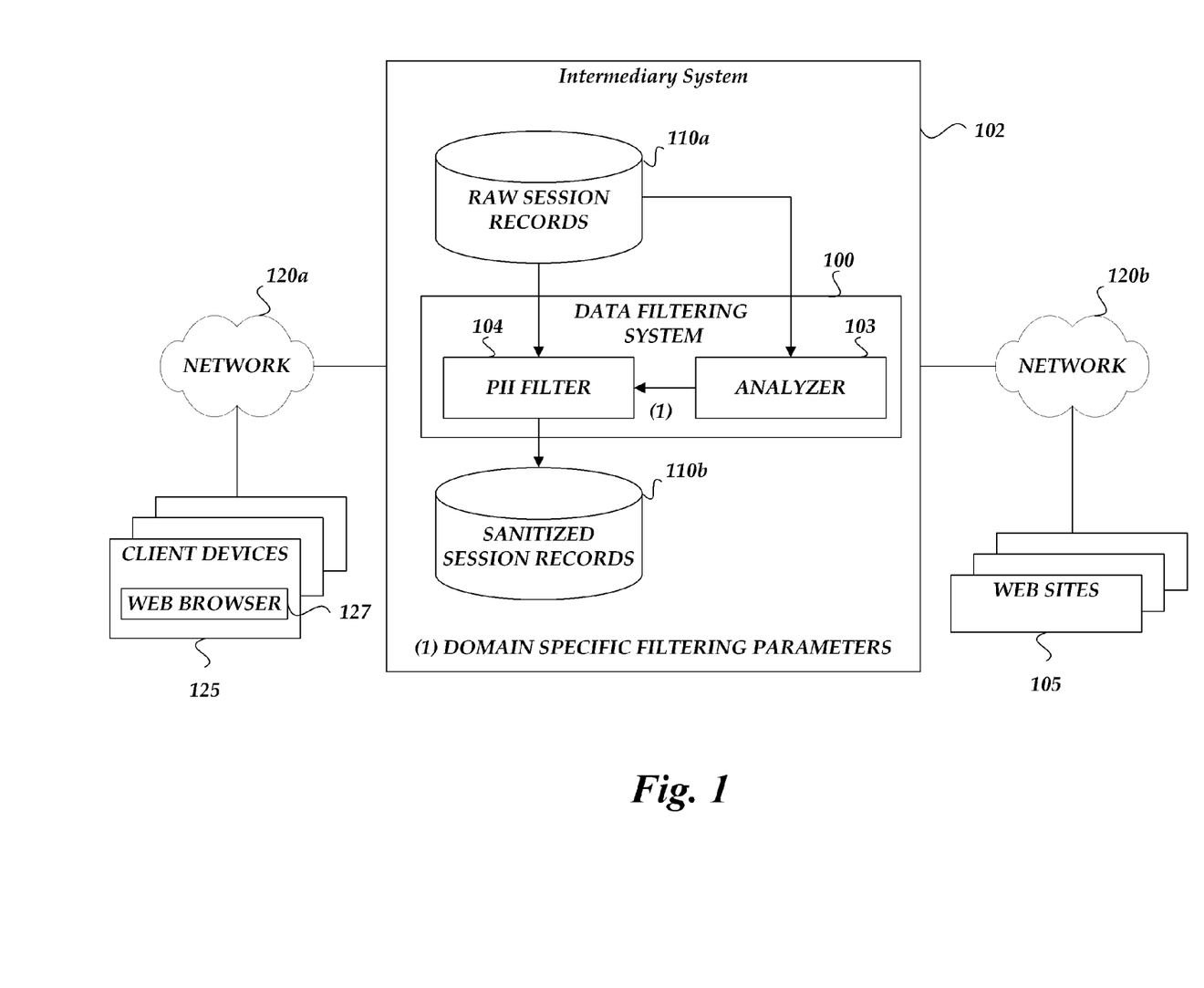
FIG. 1 is a network diagram schematically illustrating an embodiment of a data filtering system that filters personally identifiable information from stored records.

FIG. 1 is a network diagram schematically illustrating an embodiment of a data filtering system 100 that filters personally identifiable information from stored records. The data filtering system 100 can include one or computing devices comprising processor(s) and computer memory. In the illustrated embodiment, the data filtering system 100 includes an analyzer 103 and a PII filter 104. In one embodiment, the data filtering system 100 operates on an intermediary system 102, along with other computing systems. In one embodiment, the intermediary system includes one or more data repositories 110a, 110b for storing records. In the illustrated embodiment, data repository 110a stores raw session records and data repository 110b stores the sanitized records. While the data repositories 110a, 110b are depicted as logically separate, the repositories may be physically independent or combined in a single repository. For ease of reference, the disclosure generally uses the term "data repository 110" to refer to either or both data repository 110a, 110b.

In some embodiments, the data filtering system 100 is configured to identify URL parameters, typically represented by key-value pairs having a fixed key portion and a variable value portion, that tend to be associated with personally identifiable information. The data filtering system 100 can then build a list of parameters keys that tend to be associated with values that contain personally identifiable information. Once the system has identified these URL parameter keys, the system can filter out instances of these parameter keys, including the associated value data, in session records in order to sanitize the records of personally identifiable information. In some embodiments, the data filtering system 100 is configured to test whether a URL parameter value designated for filtering affects the requested page content specified in the URL. Parameters that do not affect the requested page content can be removed from the URL while still allowing the system to retain data on which page content was requested by the users. Such anonymized information can be useful for tracking long term trends, popular pages on domains, popular products offered on domains and/or the like, while preserving users' privacy. In some embodiments, the system 100 may be configured to filter personally identifiable information from 1,000, 10,000, 100,000 or more than 100,000 records at a time, either periodically, asynchronously, in real-time or in near-real time.

In one embodiment, the data repository 110 includes user session records from transactions between user client devices 125 and various web sites 105. Such session records can include URL data, such as the URLs requested by users, from which information such as the most visited pages, rate of change in visits or the like can be derived.

In some embodiments, the intermediary system 102 is logically positioned between the various web sites 105 and the client devices 125. For example, the intermediary system 102 may be part of an Internet Service Provider (ISP) that connects client devices to websites, a content delivery network that provides content from web sites to client devices, a proxy server, or some other system that processes URL requests from the client devices. In one embodiment, the intermediary system 102 requests and/or pre-processes web pages on behalf of web browser 127 users. In one embodiment, the intermediary system 102 is part of a cloud computing service provider that hosts many distinct web sites of many different entities, and the session data (e.g., clickstream data or browse history data) collected by the system 100 may be based on accesses to those sites. As the intermediary system 102, in some embodiments, is situated between the network data flow from the client devices 125 and the websites 105, the system 102 can obtain the session records by recording URL requests and/or other data sent by users to the various domains or sites. As will be recognized, the arrangement shown in FIG. 1 represents just one of many possible ways that browse history or "clickstream" data may be collected. The PII identification and filtering methods described herein are not limited to any particular method or arrangement for collecting such data.

In one embodiment, the session records are obtained from web browsers 127 operating on client devices 125, which may be configured to record user session data when visiting various websites. In one embodiment, the data filtering system 100 may be implemented as part of the web browser (e.g., an add-on module or other browser extension) or be otherwise accessible by the web browser, such that the browser 127 can anonymize the session data during or after a user session.

In one embodiment, the intermediary system 102 is connected via one or more networks 120a, 120b to one or more client computing devices 125 and one or more web sites 105. The illustrated networks 120a, 120b may be different networks or part of the same network (e.g., the Internet). In one embodiment, the first network 120a is a public network while the second network 120b is a private network or vice versa. For ease of reference, the disclosure generally uses the term "network 120" to refer to either or both networks 120a, 120b.

The client computing devices 125 may include, for example, personal computers (PCs), personal digital assistants (PDAs), cellular telephones, laptops, tablets, e-book readers and other types of devices that support web browsing. The web sites can include various types of sites, such as sites related to shopping, news, organizations, sports, games, product reviews or the like.

As discussed above, the intermediary system 102 may receive personally identifiable information from client devices 125. In some cases, the intermediary system 102 receives a URL request message, such as an HTTP message of the form GET URL, from a user computing device 125. In one embodiment, the URL included in this request message is a string of characters of the form www.domain_name/ path_string?query_string, where domain_name is a domain name of a web site or domain to which the request is directed (e.g., "example.com"), "/" is a separator character, path_string is a character string for the location of a resource (e.g., web page) on the web site, "?" is a separator character and query_string is a character string that includes data to be passed on to software running on the destination web site 105. In some cases, the query_string can contain personally identifiable information. The domain name may be associated with IP addresses of one or more web servers of the web site/domain. The character string may include spaces, slashes, hyphens and other types of non-alphabetic characters. Although a forward slash and question mark are described above in this embodiment, a different separator character, such as a backward slash, space, plus sign or the like may additionally or alternatively be used.

In one embodiment, when a URL request is received, the intermediary system 102 records the URL in the data repository 110. In some embodiments, the intermediary system 102 records URLs during each session or transaction with a client device 125. Thus, each client device 125 can have multiple URLs associated with it in the data repository 110. For example, if the user associated with the client device 125 visited multiple web pages on or through the intermediary system 102, the intermediary system 102 can record URLs associated with each of the visited web pages.

In some embodiments, user session data stored by the intermediary system 102 includes additional or alternative data to URLs. For example, the intermediary system 102 may receive and record other types of clickstream data. In one embodiment, the system 102 records the parts of the screen a computer user clicks on while web browsing or using another software application. As the user clicks anywhere in the webpage or application, the action is logged on a client or inside the web server, as well as possibly the web browser, a router, a proxy server or an ad server. Such data can be useful for web activity analysis, software testing, market research and for analyzing employee productivity.

In some embodiments, the data filtering system 100 takes session data recorded by the intermediary system (e.g., query logs) and filters the session data to remove any personally identifiable information or other unwanted information. Session data can be used to provide users with useful, anonymized information about websites. For example, based on the collected session data, a recommendation system (independent or combined with the data filtering system 100) could identify pages that are rising in popularity, sometimes referred to as "trending."

In one embodiment, the data filtering system 100 identifies URL parameters that tend to be associated with personally identifiable information and filters those URL parameters and associated data from the session data. In some embodiments, URL parameters generally fall into one of two categories:

(1) Parameters that don't change page content: for example, sessionid, affiliateid, etc. In some embodiments, these parameters are used to track visits and referrers to a domain.

(2) Parameters that change or determine the content of a page: for example, brand, gender, country, sort order, etc. For example, a parameter can affect content by (a) narrowing content by filtering the content on the page (e.g., t-shirt size=XS); (b) specifying content by determining the set of content displayed on a page (e.g., store=women); and/or (c) translating content by displaying a translated version of the content (e.g., lang=fr).

In addition to the learning-based filtering methods described herein, a set of "fixed" filtering rules may be used to filter out the PIT. In some embodiments, the data filtering system 100 filters stored URLs using one or more of the following "fixed" filtering rules:

1. Log only HTTP requests, not HTTP Secure (HTTPS), File Transfer Protocol (FTP) or other request types.

2. Do not log http requests from domains known to be intranets, which can be identified by IP address or by browser variables such as the "zone" variable in Internet Explor; and/or 3. Truncate all the URLs at the "?" separator.

In one embodiment, the data filtering system 100 uses all the above fixed filtering rules. However, in some cases, this may result in overinclusiveness in the filtered data, where non-personally identifiable information data is also filtered out. Thus, other embodiments of the data filtering system 100 may use different techniques.

For example, rather than performing all the above filtering rules, in some embodiments, the data filtering system 100 filters stored URLs using one or more of the following fixed filtering rules:

1. Domain specific rules, for example:
Log only HTTP requests, not HTTPS, FTP, or other request types.
Do not log HTTP requests from domains known to be intranets, which can be identified by IP address or by browser variables such as the "zone" variable in Internet Explorer.

2. Query parameter related rules, for example:
Truncate the URL at the "?" separator if the URL contains anything from a blacklist. For example, the blacklist can include parameters such as user=, userid=, username=, pass=, pw=, passwd=, password=, email=, e-mail= or the like.

3. Website specific rules, for example:
For popular websites, determine how each website uses query parameters and include specific filters for each major website.
Determine popular mod_rewrite methods for popular websites and create a rule set that accounts for the mod_rewrite methods. Mod_rewrite is a function in the Apache web server used for rewriting a URL at the server level. For example, a user may ask for http://www.example.com/widgets/blue/, but will instead be given http://www.example.com/widgets.php?colour=blue by the server.

4. Website type specific rules (e.g., retail websites vs. news websites vs. search engines etc.). Different types of websites may have particular ways of formatting URLs or may tend to use particular parameters. For example, retail websites tend to use user identity related parameters since the retail websites need to associate user purchases with user accounts. In another example, search engines tend to use address related parameters as users sometimes search for places of interest near their home.

In some embodiments, the data filtering system 100 iteratively filters query parameters in a URL. This allows the data filtering system 100 to check whether filtering particular query parameters removes useful information from the URL, such as by turning the filtered URL into an invalid URL. In one embodiment, for each <key>=<value> parameter type, the data filtering system 100 performs the following:

Remove <key>=<value> from the URL;
Parse the resulting webpage; if it is a valid URL, compare the content of the webpage to the original;
If the webpage is different from the original, add the <key>=<value> back.

For each URL filtered using the above rules, the system 100 can check if the resource is still reachable by the filtered URL. If not, the system 100 can undo changes to the filtered URL, delete the filtered URL, or otherwise revert to an older or original version. In some embodiments, the system 100 may identify some URLs that are difficult to process automatically and designate those URLs for manual review and/or filtering.

While the above techniques describe rule-based or fixed filtering embodiments of the data filtering system 100, in some embodiments, the data filtering system 100 uses learning-based filtering methods alternatively to or in combination with the above fixed filtering techniques to perform filtering of personally identifiable information. For example, in some embodiments, the data filtering system 100 dynamically creates filtering rules by analyzing session data in order to identify characteristics of personally identifiable information. The data filtering system 100 then creates filtering rules that enable filtering personally identifiable information from the session data. Such learning-based embodiments are discussed in further detail in FIG. 3. In comparison to the above described rule-based embodiments, such dynamic embodiments can enable more automated processing of the session data by "learning" or otherwise self-generating at least some filtering rules.

Many system architecture variations of data filtering system 100 are possible. In some embodiments, the data filtering system 100 is connected to other components of the intermediary system, such as the first data repository 110a and the second data repository 110b, via a network, a system bus or other communications medium. In some embodiments, the first data repository 110a and the second data repository 110b are part of the data filtering system 100. The components can be connected to each other via a network, such as a public network, private network and/or the Internet. The connecting network may include multiple networking devices such as, for example, switches, edge routers, core routers, etc. The connecting network can be, but need not be the same as networks 120a, 120b. The components can be operating on one or more computing devices. In one embodiment, the components of the intermediary system 102 reside on the same data center.

Data repositories (e.g., data repository 110a, 110b) can be local to components of the data filtering system 100 or can be on networked or distributed systems. The data repositories may be implemented using any type or types of physical computer storage. For example, such data repositories can include magnetic hard drives, solid state drives or memory, optical disc and/or the like. Various data structures can be used to store the data, such as electronic files, databases or other data structure.

Figure 2:
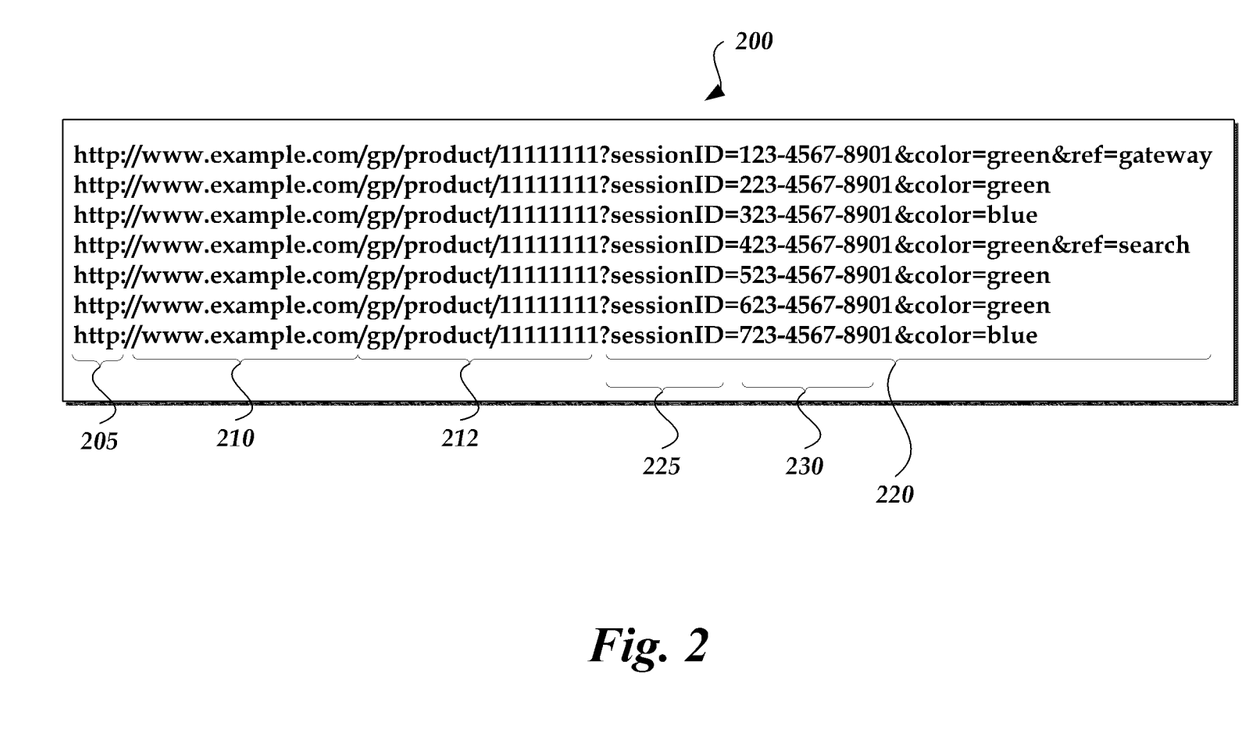
FIG. 2 schematically illustrates example URLs, including example query parameters, that may be processed by the data filtering system.

FIG. 2 schematically illustrates example URLs, including example query parameters. As defined in Request for Comments (RFC) 3986, the generic syntax of a URI comprises the following components and hierarchy: SCHEME://AUTHORITY/PATH? QUERY#FRAGMENT. A URI can be classified as a locator, a name or both. The term Uniform Resource Locator (URL) generally refers to the subset of URIs that identifies a resource and provides data to locate the resource by describing the resource's primary access mechanism (e.g., its network location).

In the above generic URI syntax, the five components: SCHEME, AUTHORITY, PATH, QUERY and FRAGMENT are separated by the characters "//", "/", "?", and "#", respectively. The first component, SCHEME, identifies the particular scheme design of the URI; the second component, AUTHORITY, identifies the resource that is responsible within the SCHEME design for parsing the remaining portion of the URL; the third component, PATH, represents the hierarchical data, which, combined with the data represented by the non-hierarchical component, QUERY, identify the primary resource corresponding to the URI; and the fifth and last component, FRAGMENT, identifies a secondary resource with respect to the primary resource identified by the components PATH and QUERY. Except for the SCHEME component, all of the components do not have to be present in a URI. Some common examples of URIs are:

(1) http://www.example.com/index.html (web page);
(2) ftp://ftp.example.org/public/download.txt (document files);
(3) http://ftp.example.com:80/textbook.html#Chapter1 (segment of a web page);
(4) mailto: JohnDoe@example.com (e-mails); tel (telephone calls).

Referring to the illustrated example URLs in FIG. 2, the example URLs include a scheme 205 (e.g., "http"), an authority or domain 210 (e.g., "www.example.com"), a path 212 and a query 220. The query 220 can include one or more query parameters. For example, one illustrated query parameter includes the key-value pairs of "sessionId" 225 and the corresponding values 230 for that key. Another example parameter includes the key-value pairs of "color" and the corresponding values (e.g., "green" or "blue"). Another example parameter includes the key-value pairs of "ref" and the corresponding values (e.g., "gateway").

HTTP is discussed in detail in the Internet Engineering Task Force (IETF) Request for Comments (RFC) 2616 (June 1999): "Hypertext Transfer Protocol—HTTP/1.1"] (available at www.ietf.org/rfc/rfc2616.txt and incorporated herein by reference in its entirety). URI is discussed in detail in IETF STD 0066/RFC 3986 (January 2005): "Uniform Resource Identifier (URI)" (available at www.ietf.org/rfc/rfc3986.txt and incorporated herein by reference in its entirety).

Figure 3:
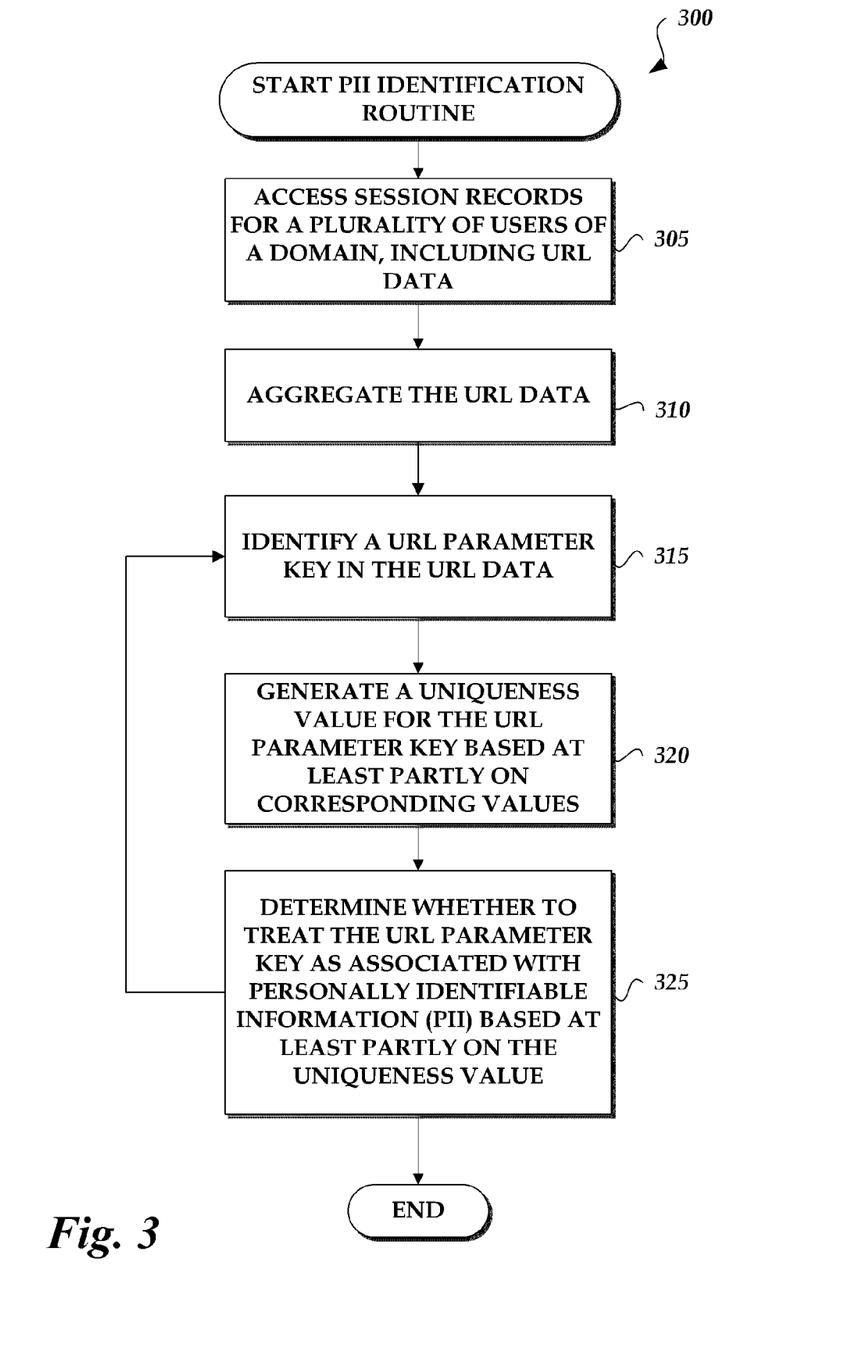
FIG. 3 schematically illustrates a logical flow diagram for a personally identifiable information identification routine embodiment.

FIG. 3 schematically illustrates a logical flow diagram for a process 300 to generate site-specific filtering parameters or rules based on an analysis of session records of multiple users. In some implementations, the process is performed by embodiments of the data filtering system 100 described with reference to FIG. 1 or by another a component of the system 100, such as the analyzer 103. For ease of explanation, the following describes the process as performed by the data filtering system 100. The process is discussed in the context of an example scenario that is intended to illustrate, but not to limit, various aspects of the data filtering system 100. In some embodiments, the process 300 is repeated for each site/domain for which a statistically significant quantity of browse history data has been collected.

Beginning at block 305, the data filtering system 100 accesses session records for a site or domain for a plurality of users, including URL data such as records of URL requests made by the users. For example, the data filtering system 100 may access query logs of URL requests or other session records, which may be stored on a data repository 110 of FIG. 1. In one embodiment, the data filtering system 100 accesses session data collected over a period of time, such as 30 days worth of user data. As discussed above, the session data may be collected from domains accessed by users or provided by web browsers on the client device, for example, from session caches recorded by the web browsers.

At block 310, the data filtering system 100 aggregates the URL data from the session records into multiple groupings. In one embodiment, aggregating the data involves pattern matching a front portion of the URL, such as the scheme, domain and/or path. For example, the data filtering system 100 may aggregate the URL data at the domain level for smaller amounts of data, at path level (e.g., before the query string) for larger amounts of data with multiple URL entries for each page, or using some other portion of the URL. An example aggregated grouping may include URLs beginning with "http://www.example.com/gp/product/11111111 . . . " or "http://www.example.com . . . ."

In one embodiment, if granularity is at the domain-level, similar URLs can be clustered into smaller groups. Within a large website, different kinds of pages/resource can have different paths and query parameter attributes. Clustering can allow these different kinds of pages/resources to be sorted into similar groups. In one embodiment, K-means clustering is used on the URLs. K-means clustering is a method of cluster analysis which aims to partition n observations into k clusters in which each observation belongs to the cluster with the nearest mean. For ease of explanation, it will be assumed that aggregating and/or clustering results in k groupings, where each group can include data from multiple URL entries. In some embodiments, the data filtering system 100 performs tokenization and/or stemming on the URL strings prior to performing K-means clustering.

At block 315, the data filtering system 100 identifies a URL parameter key in the URL requests. For example, the data filtering system 100 can identify the query portion of the URL and identify the query parameters based on separator characters (e.g. "&"). In one embodiment, the data filtering system 100 extracts the query parameters (of the form <key>=<value>) from one of the K groupings. The data filtering system 100 then aggregate the values of the query parameters based on the key. For example, for one key <key1>, the corresponding set of values may be <value1, value1, value1, value2, value3, value2, etc.>.

At block 320, the data filtering system 100 generate a uniqueness value for the URL parameter key based at least partly on the corresponding values for the key. In one embodiment, the uniqueness value is calculated using the following Information Gain formula:

$$I_E(f) = -\sum_{i=1}^{m} f_i \log_2 f_i$$

fi=the fraction of items labeled with value I in the set.

In the above case, f is the key and f1, f2 ... fm are the distinct values for those keys in the dataset of k entries. For example, for a key <abc> all of whose values are the same <value1>, the formula delivers:

$$m/m*\log(m/m)=0. \quad (1)$$

Similarly for a key whose values are all different, the formula delivers:

$$1/m*\log(1/m)+1/m*\log(1/m) \ldots m \text{ times}. \quad (2)$$

The uniqueness value can be used to as an indication of whether the parameter key is likely to be associated with personally identifiable information. Parameters that are associated with values that are less unique tend not to be associated with personally identifiable information. For example, if a parameter has the same value for different users on different sessions, such a parameter is likely not changed based on the user and therefore probably not personally identifiable information. Some examples of such parameters are parameters related to page presentation (e.g., color, format, encoding, page location, etc.), product identifiers, function names or the like. Meanwhile, parameters that are associated with values that are more unique tend to be associated with personally identifiable information. For example, if a parameter has different values for different users or different values for the same user on different sessions, such a parameter likely changes based on the user and therefore probably includes personally identifiable information. Some examples of such parameters are parameters related to session identifiers, user identifiers, passwords, emails, address, phone numbers or the like.

In one embodiment, the data filtering system 100 generates the uniqueness value by calculating an entropy value for a URL parameter using entropy algorithms. In information theory, entropy is a measure of the uncertainty associated with a random variable. For example, Shannon entropy quantifies the expected value of the information contained in a message. In one embodiment, a low entropy value indicates that the value data does not vary much while a high entropy value indicates that the value varies greatly. For similar reasons as discussed above, high variability tends to indicate the presence of personally identifiable information that changes based on the user while low variability tends to indicate the non-presence of personally identifiable information.

At block 325, the data filtering system 100 determines whether to treat the URL parameter key as associated with personally identifiable information based at least partly on the uniqueness value. In one embodiment, the data filtering system 100 adds the URL parameter key to a list of parameter keys deemed to be associated with personally identifiable information. For example, the data filtering system 100 may add any key having a uniqueness value above a certain threshold to the personally identifiable information parameter list. The threshold value may be domain specific or a general value. In some cases, the threshold value may be a setting that is adjusted by an examiner and/or the data filtering system 100. Adjusting the threshold value can affect the overinclusiveness or underinclusiveness of the personally identifiable information parameter list. For example, the threshold value may be set such as to be overinclusive in order to identify more parameter keys that may be associated with personally identifiable information.

In one embodiment, personally identifiable information parameter lists are maintained per domain, site, or other grouping. (Typically, each site corresponds uniquely to a particular domain, although this need not be the case.) The routine may then end or proceed back to block 315 to process other URL parameters keys and calculate uniqueness scores for the other URL parameters. In one embodiment, the routine stops once uniqueness values have been calculated for all the URL parameters in the K groupings. As discussed above, the routine may be rerun to process session data for another domain or site. In some cases, there may not be enough session data for a particular domain or site to provide a useful analysis. In some embodiments, the system 100 filters out non-statistically significant data from those domains or sites with not enough session data from the sanitized session records.

In one embodiment, a higher uniqueness value increases the likelihood that the data filtering system 100 treats a particular URL parameter as being associated with personally identifiable information. The data filtering system 100 may base its determination on other factors in addition to or instead of the uniqueness value. For example, one factor that the data filtering system 100 can consider is the extent to which the value portion of the parameter remains fixed within sessions. Parameters that do not change across sessions, such as date-related parameters, tend to indicate non-PII data. In another example, another factor that the data filtering system 100 can consider is a measure of how much URL request data exists in said session records for said URL parameter. Lower amounts of data tend to reduce the reliability of analysis performed on the data, generating greater uncertainty in, for example, any uniqueness value calculated from such data. The system 100 can account for that by reducing the uniqueness value by some factor.

Figure 4:
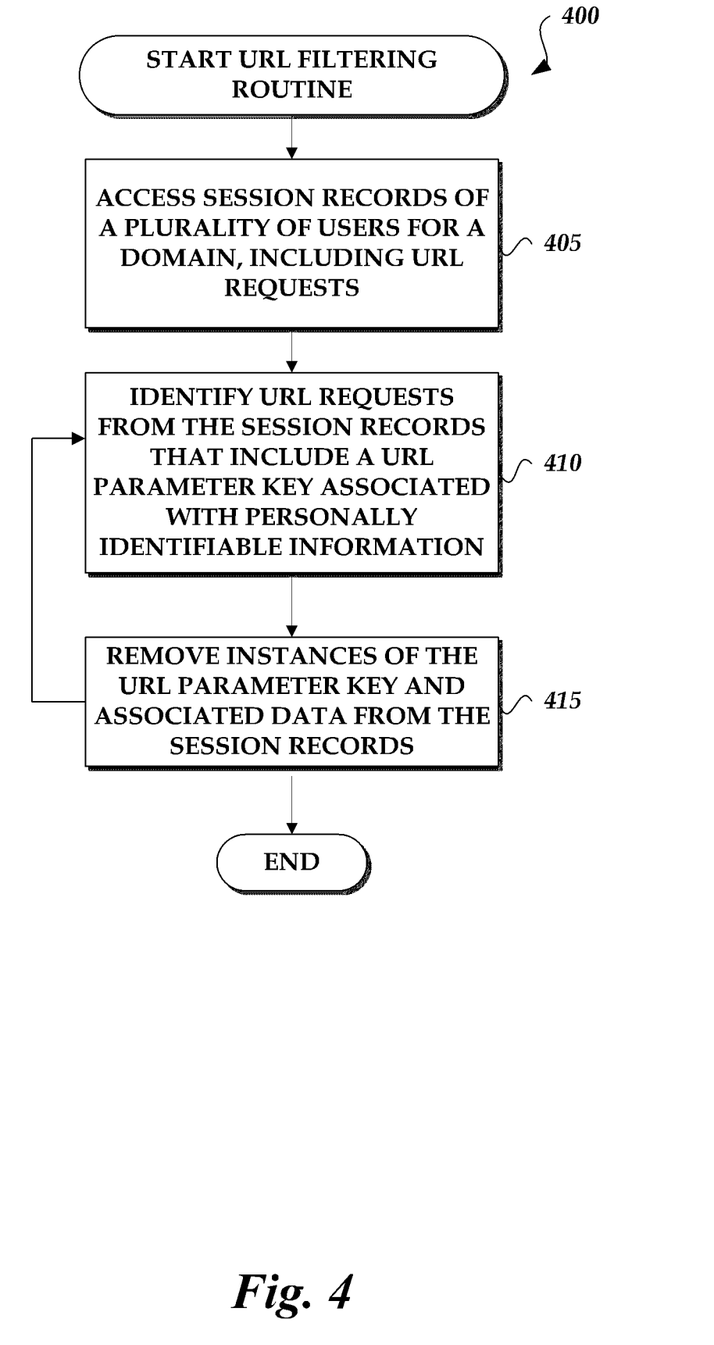
FIG. 4 schematically illustrates a logical flow diagram for a URL filtering routine embodiment.

FIG. 4 schematically illustrates a logical flow diagram for a URL filtering process 400 that may be implemented by the PII filter 104 of FIG. 1 or another component of the data filtering system 100. For ease of explanation, the following describes the process as performed by the data filtering system 100. The process 400 is discussed in the context of an example scenario that is intended to illustrate, but not to limit, various aspects of the data filtering system 100. In some embodiments where the session records represent browsing actions across multiple sites, each logged URL is analyzed based on the site-specific parameters that apply to that URL's site or domain. For example, different sites may use different lists of parameter keys associated with PII.

Beginning at block 405, the data filtering system 100 accesses session records of a plurality of users of a domain or site, wherein the session records include URL data such as the URL requests made by the users. For example, the data filtering system 100 may access query logs of URL requests or other session records, which may be stored on a data repository 110 of FIG. 1. In one embodiment, the data filtering system 100 accesses session data collected over a period of time, such as 30 days worth of user data. As discussed above, the session data may be collected from domains accessed by users or provided by web browsers on the client device, for example, from session caches recorded by the web browsers.

At block 410, the data filtering system 100 identifies URL requests from the session records that include a URL parameter key deemed to be associated with personally identifiable information. In one embodiment, the data filtering system 100 maintains a data structure (e.g., a blacklist or database) storing a list of URL parameters deemed to be associated with personally identifiable information. In one embodiment, the list is stored on the data repository 110. As described above in relation to FIG. 3, the data filtering system 100 can use the personally identifiable information identification routine 300 to identify URL parameter keys that have been identified by the data filtering system 100 as likely associated with personally identifiable information. In some cases, the list may be overinclusive, including parameter keys that are not actually associated with personally identifiable information, or the list may be underinclusive, not including all parameter keys in the session records actually associated with personally identifiable information. Thus, in one embodiment, the list of URL parameter keys serves as a proxy or indication for personally identifiable information that can be used to at least reduce the amount of personally identifiable information included in the session records. In some embodiments, additional routines may be applied to the session records to further reduce or completely eliminate personally identifiable information.

At block 415, the data filtering system 100 removes or strips instances of the URL parameter key and associated value data from the session records. In some embodiments, the data filtering system 100 applies pattern matching routines to the session records to identify instances of the parameter key. It can then identify the matching value pair to each instance and remove both the parameter key instance and the associated value data. As discussed above, the parameter key can serve as a proxy or indication for personally identifiable information and, by removing the parameter key and associated data, the data filtering system 100 can likely reduce the personally identifiable information stored in the session records.

In some embodiments, the modified URL is tested (submitted to the associated server/domain) to determine whether it is still a valid URL after being modified to remove the URL parameters deemed to be associated with PII. The system 100 can check if the original destination is still reachable by the modified URL. If not, the system 100 can undo changes to the modified URL, delete the modified URL, or otherwise revert to an older or original version. In some embodiments, the system 100 may identify some URLs that are difficult to process automatically and designate those URLs for manual review and/or filtering.

In some embodiments, the data filtering system 100 replaces a removed parameter with a filler parameter that does not contain personally identifiable information to indicate the URL has been modified. In some embodiments, the data filtering system 100 replaces the removed parameter in a one-to-one manner, so that associations within session data are preserved. For example, the system 100 may replace names like "John Doe" with "user1" so that the intermediary system 102 can still identify which sites or pages "user1" visited without knowing the identify of "user 1."

In some embodiments, at least some session records are flagged for further review. For example, if a particular URL parameter cannot be determined to be or not be associated with PII (e.g., if the uniqueness value is indeterminate), the data filtering system 100 can flag URLs in the session records with that URL parameter for further review. This may be done instead of removing the URL parameter.

In some embodiments, the data filtering system 100 repeats at least block 410 and 415 multiple times, for example, if processing a list of URL parameter keys with multiple entries. The data filtering system 100 can go through the list until each URL deemed to be associated with personally identifiable information is removed from the session data. In some embodiments, the data filtering system 100 may process multiple lists URLs. For example, the data filtering system 100 may have a list of common keys applicable to all domains and/or a domain specific list of parameter keys. The data filtering system 100 can process each list until it removes all the instances of the parameter keys in the session data. The routine 400 can then end.

Additional Embodiments

Many variations of the data filtering system 100 are possible. For example, while the above disclosure has generally described the system 100 as operating on an intermediary system 102, in some embodiments, the data filtering system 100 operates on the web sites 105. For example, web sites can use the data filtering system to filter personally identifiable information from various logs and records maintained by the web sites.

Web sites may find the data filtering useful 100 because web sites receive personally identifiable information directly and indirectly from users. For example, web sites may receive personally identifiable when users browse the sites. Web sites may also receive personally identifiable information from the referring systems. In some cases, the referring systems (e.g., a search page or link aggregator site) can pass on personally identifiable information to the web site, for example, through the Hypertext Transfer Protocol (HTTP) referrer field (sometimes called "HTTP referer") or another HTTP header field. Generally, the HTPP referrer field identifies the address of the webpage (e.g., a URL, Uniform Resource Identifier (URI), Internationalized Resource Identifier (IRI) or the like) of the resource which links to it. By checking the HTTP referrer field, the domain can determine where the request originated. For example, when a user clicks a link in a web browser, the browser sends a request to the server holding the destination webpage. The request can include the referrer field, which identifies the last page the user was on (e.g., the page from which the user clicked the link). In some embodiments, the domain logs the referrer information to identify where people are visiting them from, for statistical or security purposes. For example, referrer data can be used to cross-site request sources in order to identify forged requests. However, in some cases, the referrer data may contain personally identifiable information. Thus, web sites may find it useful to implement a data filtering system 100 to remove personally identifiable information from at least some of their records.

Other variations of the data filtering system 100 are also possible. For example, while embodiments above have been described as processing URLs, other embodiments may apply the above described techniques to other forms of URIs. In some embodiments, the above techniques are applied to any type of text that include filterable information (e.g., PII) contained in some form of key and value pair. For example, network access logs can contain information on what users accessed particular resources on the network. The system 100 can be used to anonymize those access logs so that the anonymized access logs can be used to track high usage resources without retaining personally identifiable information.

Another variation uses the above described learning-based filtering methods with one or more fixed filtering methods. For example, the process 400 of FIG. 4 may also use lists (e.g., blacklists) of known parameters used to designate PII in addition to the list of parameters that are suspected of using PII, such as highly unique parameters. One example blacklists could include parameters such as user=, userid=, username=, pass=, pw=, passwd=, password=, email=, e-mail= or the like.

As described above, the data filtering system 100 can be implemented with one or more physical servers or other computing machines, such as several computing machines interconnected via a network. Thus, each of the components depicted in the data filtering system 100 can include hardware and/or software for performing various features. In one embodiment, the data filtering system 100 is implemented on a computing system that hosts a web site or collection of web sites that the system 100 monitors.

The data filtering system 100 can include one or more servers for receiving and responding to requests from a network, such as requests to process session records. The one or more servers can include web servers, application servers, database servers, combinations of the same, or the like.

The processing of the various components of the data filtering system 100 can be distributed across multiple machines, networks and other computing resources. The various components of the data filtering system 100 can also be implemented in one or more virtual machines, rather than in dedicated servers. Likewise, data repositories can include represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the data filtering system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of interactions (additionally or alternatively) between the data filtering system 100 and the users and/or user systems are possible in addition to those described above. For example, a data filtering system 100 interaction can be received directly from a user or administrator (e.g., via an interactive console, web browser or other GUI provided by the data filtering system 100) or from an executing program. In some embodiments, users may interact with the data filtering system 100 using other types of interfaces and in other ways.

In some embodiments, the data filtering system 100 and its components are executed or embodied by one or more physical or virtual computing systems. For example, in some embodiments, a server computing system that has components including a central processing unit (CPU), input/output (I/O) components, storage and memory may be used to execute some or all of the components of the data filtering system 100. The I/O components can include a display, a network connection to the network 105, a computer-readable media drive and other I/O devices (e.g., a keyboard, a mouse, speakers, etc.). In some embodiments, the data filtering system 100 may be configured differently than described above.

An embodiment of the data filtering system 100 can be stored as one or more executable program modules in the memory of the server and/or on other types of non-transitory computer-readable storage media, and the data filtering system 100 can interact with computing assets over the network 105. In one embodiment, the data filtering system 100 may have additional components or fewer components than described above. For example, the data filtering system 100 may be built on top of existing software development or testing systems and designed to coordinate the actions of the existing systems.

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, act, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A method of identifying Uniform Resource Locator (URL) parameters that indicate personally identifiable information, the method comprising:

accessing, for a given network domain, session records of a plurality of users, said session records specifying URL requests submitted by user devices to at least one server in the network domain;

identifying a URL parameter that appears in URL requests of a plurality of the session records, said URL parameter represented in URLs as a key-value pair having a fixed key portion and a variable value portion;

generating, for the URL parameter, a measure of uniqueness of the variable value portion across multiple sessions; and determining, based at least partly on the measure of uniqueness, whether to treat the URL parameter as being associated with personally identifiable information;

said method performed programmatically by a computing system that comprises one or more computing devices.

2. The method of claim 1, wherein generating the measure of uniqueness comprises calculating an entropy URL parameter.

3. The method of claim 1, wherein said determination is made such that an increase in the measure of uniqueness increases a likelihood that the URL parameter will be treated as being associated with personally identifiable information.

4. The method of claim 1, wherein the determination of whether to treat the URL parameter as being associated with personally identifiable information is based additionally on a measure of an extent to which the value portion remains fixed within sessions.

5. The method of claim 1, wherein the determination of whether to treat the URL parameter as being associated with personally identifiable information is based additionally on a measure of how much URL request data exists in said session records for said URL parameter.

6. The method of claim 1, wherein the determination of whether to treat the URL parameter as being associated with personally identifiable information is based additionally on a determination of whether the key portion is known to be associated with personally identifiable information.

7. The method of claim 1, further comprising, when a determination is made to treat the URL parameter as being associated with personally identifiable information, stripping the URL parameter from at least some of the session records.

8. The method of claim 7, further comprising, replacing the stripped URL parameter with a filler parameter that does not contain personally identifiable information.

9. A system for identifying Uniform Resource Locator (URL) parameters that indicate personally identifiable information, the system comprising:

computer memory for storing session records of a plurality of users, said session records specifying URL requests submitted by user devices to at least one server in at least one network domain;

one or more processors configured to:

identify a URL parameter that appears in URL requests of a plurality of the session records, said URL parameter represented in URLs as a key-value pair having a fixed key portion and a variable value portion;

generate, for the URL parameter, a measure of uniqueness of the variable value portion across multiple sessions; and determine, based at least partly on the measure of uniqueness, whether to treat the URL parameter as being associated with personally identifiable information.

10. The system of claim 9, wherein the system is configured to generate the measure of uniqueness by calculating an entropy URL parameter.

11. The system of claim 9, wherein said determination is made such that an increase in the measure of uniqueness increases a likelihood that the URL parameter will be treated as being associated with personally identifiable information.

12. The system of claim 9, wherein the determination of whether to treat the URL parameter as being associated with personally identifiable information is based additionally on a measure of an extent to which the value portion remains fixed within sessions.

13. The system of claim 9, wherein the determination of whether to treat the URL parameter as being associated with personally identifiable information is based additionally on a measure of how much URL request data exists in said session records for said URL parameter.

14. The system of claim 9, wherein the determination of whether to treat the URL parameter as being associated with personally identifiable information is based additionally on a determination of whether the key portion is known to be associated with personally identifiable information.

15. The system of claim 9, further comprising, when a determination is made to treat the URL parameter as being associated with personally identifiable information, stripping the URL parameter from at least some of the session records.

16. The system of claim 15, further comprising, replacing the stripped URL parameter with a filler parameter that does not contain personally identifiable information.

17. Non-transitory computer storage having stored thereon instructions that, when executed by a computer system having computer storage, cause the computer system to perform operations comprising:

accessing session records of a plurality of users, said session records specifying Uniform Resource Locator (URL) requests submitted by user devices to at least one server in at least one network domain;

accessing a data structure identifying URL parameters that are deemed to be associated with personally identifiable information, the URL parameters represented in URLs as key-value pairs having a fixed key portion and a variable value portion, the URL parameters identified based at least partly on a measure of uniqueness of the variable value portion across multiple sessions; and removing the URL parameters from at least some of the session records.

18. The non-transitory computer storage of claim 17, wherein the instructions further cause the computing system to perform operations comprising:

replacing the removed URL parameters with filler parameters that do not contain personally identifiable information.

19. The non-transitory computer storage of claim 17, wherein the instructions further cause the computing system to perform operations comprising:

identifying a first URL parameter that appears in URL requests of a plurality of the session records, said first URL parameter represented in URLs as a key-value pair having a fixed key portion and a variable value portion;

generating, for the URL parameter, a measure of uniqueness of the variable value portion of the first URL across multiple sessions; and determining, based at least partly on the measure of uniqueness, whether to treat the URL parameter as being associated with personally identifiable information.

20. The non-transitory computer storage of claim 17, wherein the instructions further cause the computing system to perform operations comprising:

in response to determining that the URL parameter is to be treated as associated with personally identifiable information, include the first parameter in the data structure identifying URL parameters that are deemed to be associated with personally identifiable information.

21. The non-transitory computer storage of claim 17, wherein the instructions further cause the computing system to perform operations comprising:

determining whether URLs having removed URL parameters are valid.

22. The non-transitory computer storage of claim 17, wherein at least some of the session records that contain the URL parameters that are deemed to be associated with personally identifiable information are flagged for further review.

* * * * *